United States Patent [19]
Kuriyama

[11] Patent Number: 5,716,420
[45] Date of Patent: Feb. 10, 1998

[54] PROCESS FOR MAKING PACKAGE-TYPE FUSED SOLID ELECTROLYTIC CAPACITOR

[75] Inventor: Chojiro Kuriyama, Ukyo-ku, Japan

[73] Assignee: Rohm Co., Ltd., Kyoto, Japan

[21] Appl. No.: 650,844

[22] Filed: May 20, 1996

[30] Foreign Application Priority Data

May 19, 1995 [JP] Japan .................. 7-121515

[51] Int. Cl.⁶ ........................................ H01G 9/15
[52] U.S. Cl. .......................................... 29/25.03
[58] Field of Search ................. 29/25.03; 361/534, 361/531, 533, 538

[56] References Cited

U.S. PATENT DOCUMENTS

| | | | |
|---|---|---|---|
| 5,057,973 | 10/1991 | Gouvernelle et al. | 29/25.03 |
| 5,099,397 | 3/1992 | Edson et al. | 29/25.03 |
| 5,179,507 | 1/1993 | Iijima | 361/534 |
| 5,216,584 | 6/1993 | Okazaki et al. | 29/25.03 |
| 5,315,474 | 5/1994 | Kuriyama | 29/25.03 |

FOREIGN PATENT DOCUMENTS

| | | |
|---|---|---|
| 0306809 | 3/1989 | European Pat. Off. |
| 0392087 | 10/1990 | European Pat. Off. |
| 39 31 251 | 3/1991 | Germany |
| 43 11 115 | 10/1993 | Germany |
| 7-29780 | 1/1995 | Japan |

*Primary Examiner*—John Niebling
*Assistant Examiner*—Thomas G. Bilodeau
*Attorney, Agent, or Firm*—Merchant Gould Smith Edell Welter and Schmidt

[57] ABSTRACT

A process is provided for making a package-type fused solid electrolytic capacitor. In the process, a capacitor element having a chip body and an anode wire is first mounted between an opposed pair of anode and cathode leads with the anode wire attached to the anode lead, the cathode lead having a tip cutout. Then, a material fuse wire is connected to the chip body and the cathode lead with an intermediate portion of the material fuse wire located in the tip cutout of the cathode lead. Then, a resin package is molded to enclose the capacitor element together with the material fuse wire. Then, the resin package is separated from the anode and cathode leads by cutting. Then, an anode terminal electrode and a cathode terminal electrode are formed on the resin package in electrical conduction with the anode wire and the fuse wire, respectively.

8 Claims, 10 Drawing Sheets

PROCESS FOR MAKING PACKAGE-TYPE FUSED SOLID ELECTROLYTIC CAPACITOR

BACKGROUND OF THE INVENTION

1. Field of the Invention

This invention relates to a process for making a solid electrolytic capacitor. More specifically, the present invention relates to a process for making a solid electrolytic capacitor of the type which incorporates a safety fuse wire, such as an overcurrent fuse or a temperature, enclosed in a resin package together with a capacitor element.

2. Description of the Related Art

A package type fused solid electrolytic capacitor is known which comprises a capacitor element having a chip body and an anode wire projecting from the chip body, a safety fuse wire having one end connected to the chip body, a resin package enclosing the capacitor element together with the fuse wire, an anode lead connected to the anode wire and extending out of the resin package, and a cathode lead connected to the other end of the fuse wire and extending out of the resin package. Such a capacitor is disclosed in European Patent Publication No. 0306809 for example.

A similar solid electrolytic capacitor is also disclosed in European Patent Publication No. 0392087 but differs from the capacitor of European Patent Publication No. 0306809 only in that the safety fuse wire is arranged between the anode wire of the capacitor element and the anode lead.

Either of the capacitors described above equally has two leads which are partially inserted in the resin package and partially extend out of the resin package. Therefore, the resin package must be enlarged enough to enclose part of the leads. Further, the portions of the leads extending out of the resin package also add to the size and weight of the capacitor as a whole. As a result, the prior art capacitor disclosed in each of the above-described publications has a disadvantage of being relatively large and heavy In view of this problem, the inventor of the present invention has previously proposed a leadless package-type fused solid electrolytic capacitor in Japanese Patent Application Laid-open No. 7-29780 (Laid-open: Jan. 31, 1995) corresponding to U.S. patent application Ser. No. 08/267, 233 filed Jun. 29, 1992. For clarity, such a leadless capacitor is now described with reference to FIG. 21.

As shown in FIG. 21, the prior art leadless solid electrolytic capacitor comprises a capacitor element 1 having a chip body 1a and an anode wire 1b projecting from the chip body 1a, and a safety fuse wire 2 having one end connected to the chip body 1a. An intermediate portion of the fuse wire 2 is enclosed in an elastic resin member 6. A resin package 3 encloses the capacitor element 1 together with the fuse wire 2 in a manner such that the tip end of the anode wire 1b is exposed at a first end face 3a of the package 3 while the other end of the fuse wire 2 is exposed at a second end face 3a the package 3. An anode terminal electrode 4 consisting of an inner anode electrode layer 4a and an outer plated anode electrode layer 4b is formed on the first end face 3a of the resin package 3 in electrical conduction with the anode wire 1b. Similarly, a cathode terminal electrode 5 consisting of an inner cathode electrode layer 5a and an outer plated cathode electrode layer 5b is formed on the second end face 3b of the resin package 3 in electrical conduction with the fuse wire 2.

Due to the leadless structure, the capacitor illustrated in FIG. 21 can be reduced in size and weight in comparison with a conventional capacitor incorporating anode and cathode leads. However, in manufacturing the prior art leadless capacitor, since there is no lead which positionally fixs the fuse wire 2 at the time of molding the resin package 3, the fuse wire 2 may positionally deviate due to injection of a fluid resin material.

As a result, the outer end of the fuse wire 2 may not be properly exposed at the second end face 3b of the resin package 3, thereby failing to establish electrical connection between the fuse wire 2 and the cathode terminal electrode 5. Further, since the fuse wire 2 need be clamped between two mold members (not shown) at the time of molding the resin package 3, the fuse wire 2 may be compressively deformed or even cut by the clamping force, resulting in a poor quality of the product.

SUMMARY OF THE INVENTION

It is, therefore, an object of the present invention to provide a process for making a package type solid electrolytic capacitors which overcomes the above-described problems of the prior art.

According to the present invention, there is provided a process for making a package-type fused solid electrolytic capacitor which comprises: a capacitor element having a chip body and an anode wire projecting from the chip body; a safety fuse wire having one end connected to the chip body; a resin package enclosing the capacitor element together with the fuse wire; an anode terminal electrode formed on the resin package in electrical conduction with the anode wire; and a cathode terminal electrode formed on the resin package in electrical conduction with the fuse wire; wherein the process comprises the steps of:

mounting the capacitor element between an opposed pair of anode and cathode leads with the anode wire attached to the anode lead, the cathode lead having a tip cutout;

connecting a material fuse wire to the chip body of the capacitor element and to the cathode lead with an intermediate portion of the material fuse wire located in the tip cutout of the cathode lead;

molding the resin package to enclose the capacitor element together with the material fuse wire;

separating the resin package from the anode and cathode leads by cutting;

forming the anode terminal electrode on the resin package in electrical conduction with the anode wire; and forming the cathode terminal electrode on the resin package in electrical conduction with the fuse wire.

According to the process described above, since an intermediate portion of the material fuse wire is located in the tip cutout of the cathode lead, all or most of the clamping force applied to two mold members is born by the cathode lead at the time of molding the resin package. Thus, the material fuse wire is prevented from being compressively deformed or cut by the clamping force. As a result, the solid electrolytic capacitor can be made with a high degree of reliability at a low cost.

Preferably, the process of the present invention may further comprise an additional step of forming a resin fixer fitted in the tip cutout of the cathode lead for retaining said intermediate portion of the material fuse wire before molding the resin package. In this case, since the resin fixer firmly retains said intermediate portion of the fuse wire in the tip cutout of the cathode lead, the fuse wire is also prevented from positionally deviating due to the injected fluid resin at the time of molding the resin package. As a result, the solid electrolytic capacitor can be made with an even higher degree of reliability.

Advantageously, the process of the present invention may further comprise an additional step of forming an elastic resin member for partially enclosing the material fuse wire before molding the resin package. Further, after forming the elastic resin member but before molding the resin package, the material fuse wire may be bent for bringing said intermediate portion in the tip cutout of the cathode lead. Alternatively, before molding the resin package, the elastic resin member may be formed on the chip body of the capacitor element by depositing a fluid resin material, and the material fuse wire may be caused to be partially embedded in the deposited fluid resin material before curing thereof.

In one embodiment of the present invention, the resin package is molded so as to enclose a tip portion of the anode lead, and the tip portion of the anode lead remains in the resin package even after the resin package is separated from the anode and cathode leads.

In another embodiment of the present invention, the resin package is molded so as to enclose a tip portion of the cathode lead, and the tip portion of the cathode lead remains in the resin package even after the resin package is separated from the anode and cathode leads.

Normally, the anode and cathode leads are integral parts of a leadframe which is also formed with additional pairs of anode and cathode leads. In this case, a plurality of package-type fused solid electrolytic capacitors can be manufactured on a quantity production basis.

Other objects, features and advantages of the present invention will be fully understood from the following detailed description given with reference to the accompanying drawings.

DETAILED DESCRIPTION OF THE PREFERRED EMBODIMENTS

Figure 1:
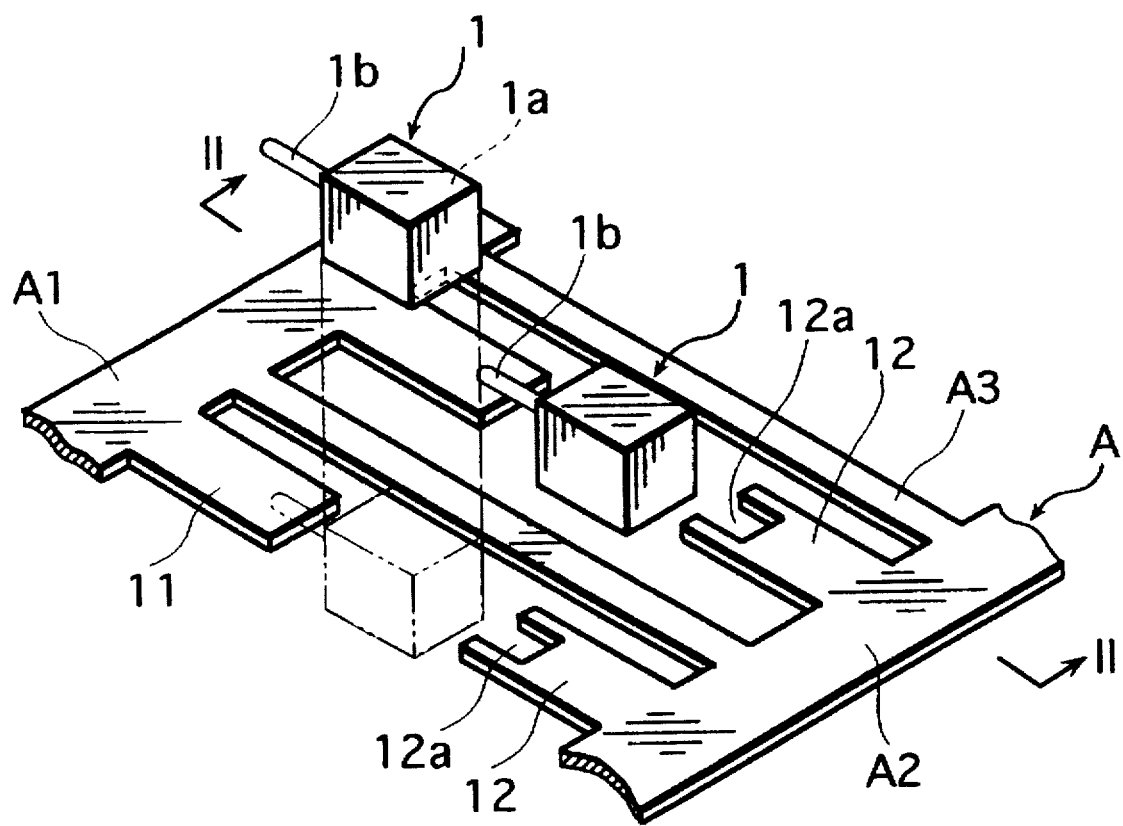
FIG. 1 is a perspective view showing a step of mounting capacitor elements on a leadframe in a process of making package-type fused solid electrolytic capacitors according to a first embodiment of the present invention.

Throughout the accompanying drawings, like parts are designated by the same reference numerals or signs.

FIGS. 1 through 14 illustrate a process for making package-type fused solid electrolytic capacitors according to the first embodiment of the present invention will be described below.

Figure 2:
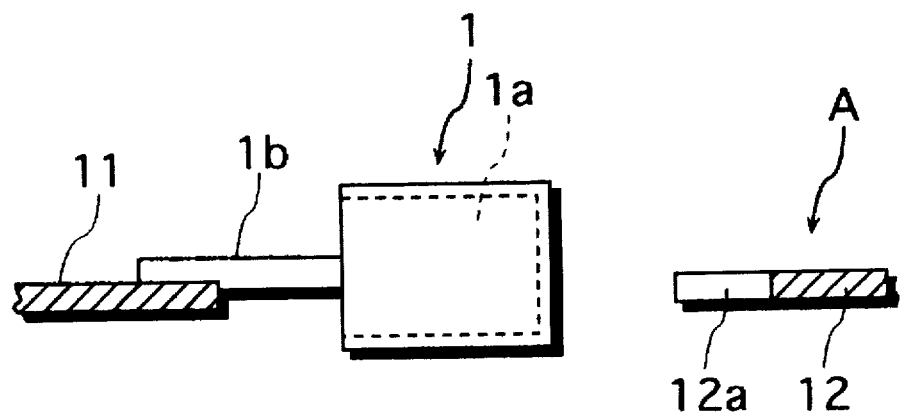
FIG. 2 is a sectional view taken on lines II—II in FIG. 1.

First, as shown in FIGS. 1 and 2, a metal leadframe A is prepared which includes a first side band A1 and a second side band A2 in parallel to the first side band A1. The first and second sides are integrally connected together by a plurality of transverse sectioning bars A3 spaced from each other at a predetermined constant pitch. The first side band A1 is integrally formed with a plurality of anode leads 11 projecting toward the second side band A2 between the sectioning bars A3.

Similarly, the second side band A2 is integrally formed with a plurality of cathode leads 12 projecting toward the first side band A1 and paired with the anode leads 11. Further, each of the cathode leads 12 is formed with a tip cutout 12a.

Then, as also shown in FIGS. 1 and 2, a capacitor element 1 is mounted to lie between each pair of anode and cathode leads 11, 12 during transfer of the leadframe A. The capacitor element 1 includes a chip body 1a and an anode wire 1b projecting from the chip body 1a. Typically, the chip body 1a may be a compacted and sintered mass of tantalum powder which is later treated by known successive steps for forming a dielectric layer, a solid electrolyte layer and a cathode electrode layer, respectively, while the anode wire 1b may be also made of tantalum. In the mounted condition, the anode wire 1b is held in contact with the anode lead 11 and fixed thereto by welding for example.

Figure 3:
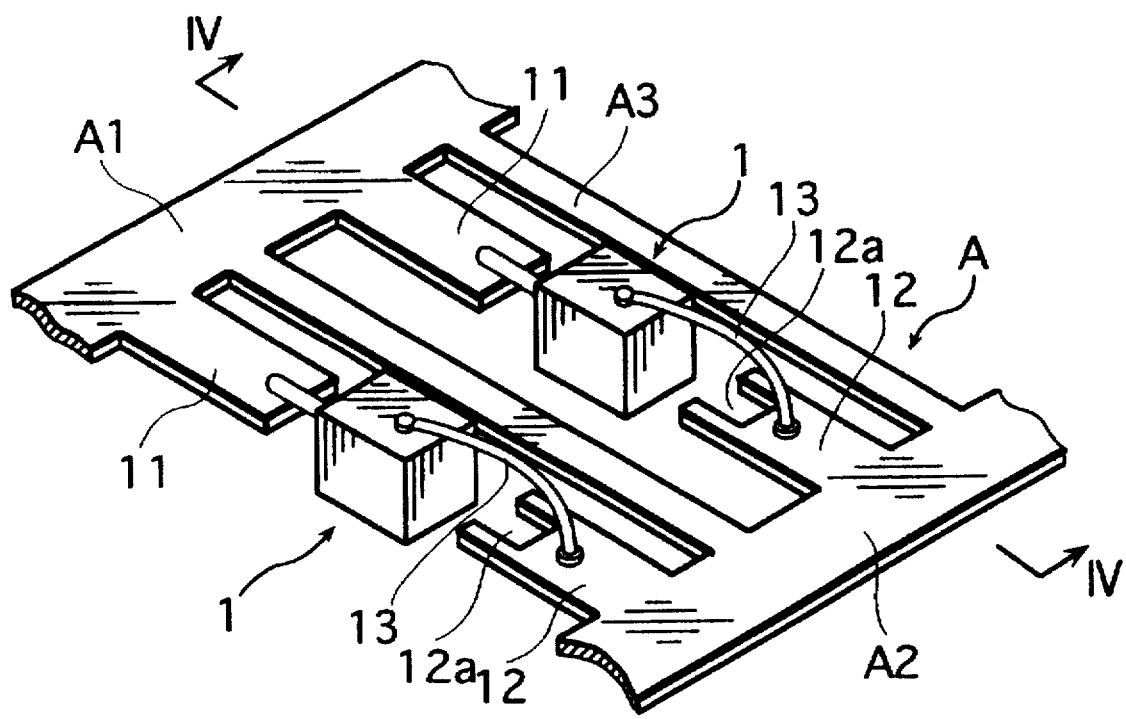
FIG. 3 is a perspective view showing a step of attaching a fuse wire for each capacitor element in the process of the first embodiment.
Figure 4:
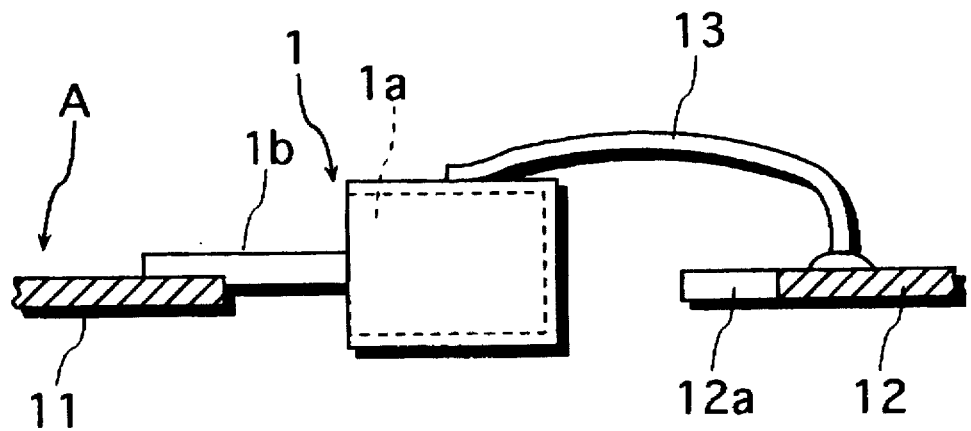
FIG. 4 is a sectional view taken on lines IV—IV in FIG. 3.

Then, as shown in FIGS. 3 and 4, a material safety fuse wire 13 is attached to extend between the chip body 1a of each capacitor element 1 and the corresponding cathode lead 12. Specifically, one end of the fuse wire 13 is bonded to a top face of the chip body 1a, whereas the other end of the fuse wire 13 is bonded to the cathode lead 12 at a portion thereof behind or laterally outwardly from the tip cutout 12a. The fuse wire 13 may be a solder wire to work as a temperature fuse. Alternatively, the fuse wire 13 may be made of a different material to work as an overcurrent fuse.

Figure 5:
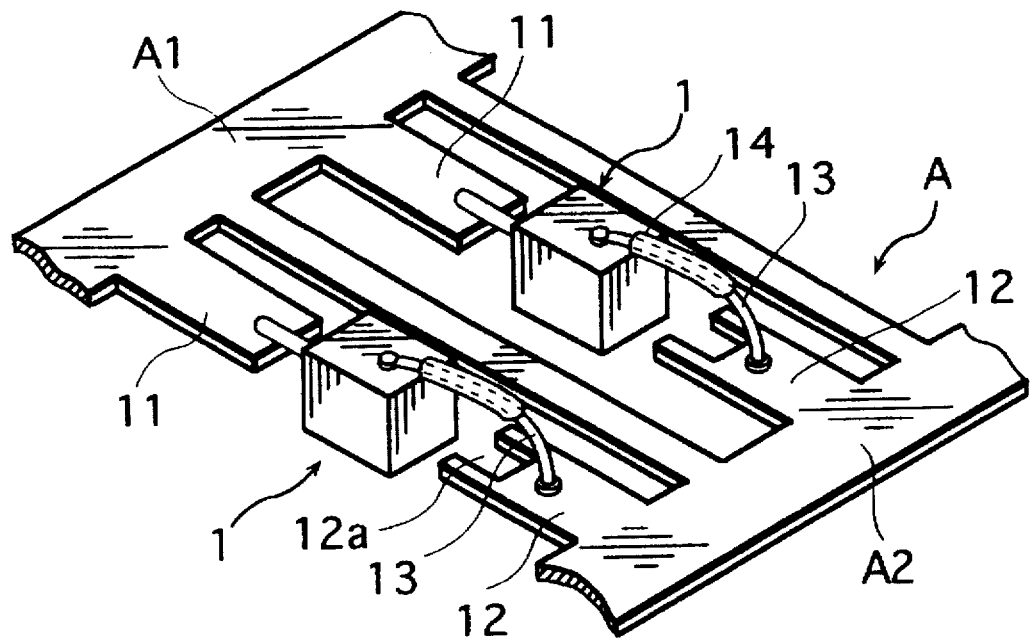
FIG. 5 is a perspective view showing a step of forming an elastic resin member for each fuse wire in the process of the first embodiment.

Then, as shown in FIG. 5, an elastic resin member 1a is formed to partially enclose each fuse wire 13. Typically, the elastic resin member 14 may be made of silicone resin.

Figure 6:
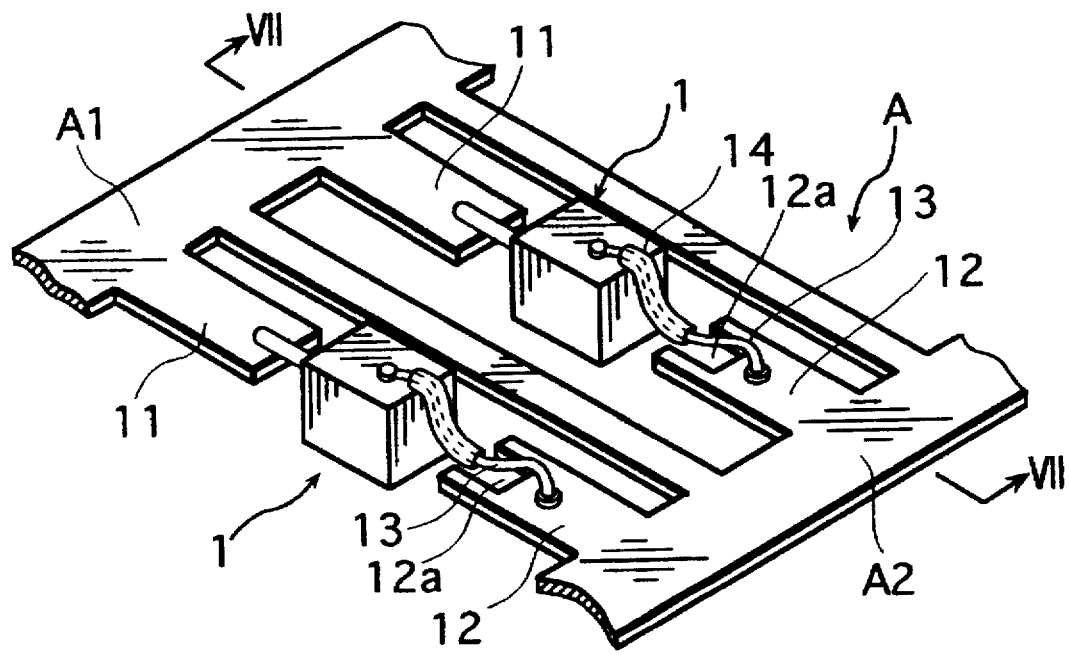
FIG. 6 is a perspective view showing a step of bending each fuse wire in the process of the first embodiment.
Figure 7:
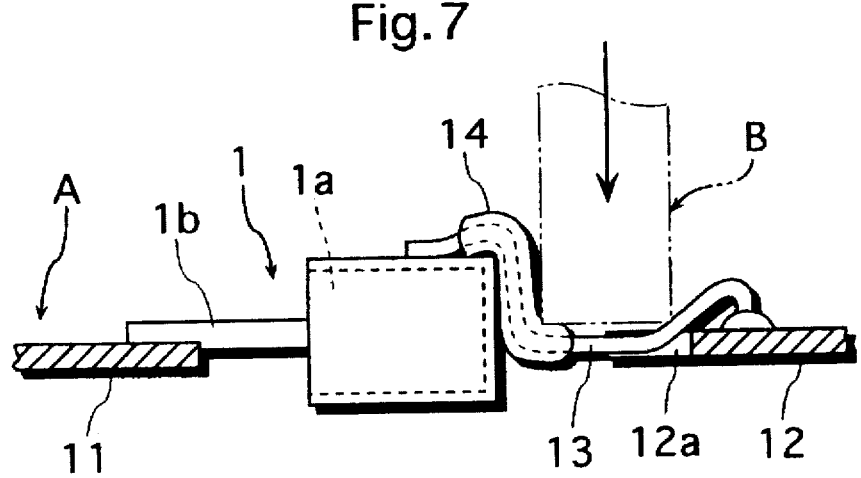
FIG. 7 is a sectional view taken on lines VI—VI in FIG. 6.

Then, as shown in FIGS. 6 and 7, an intermediate portion of each fuse wire 13 is depressed downward by a vertically movable member B so that the depressed intermediate portion is partially located in the tip cutout 12a of the corresponding cathode lead 12.

Figure 8:
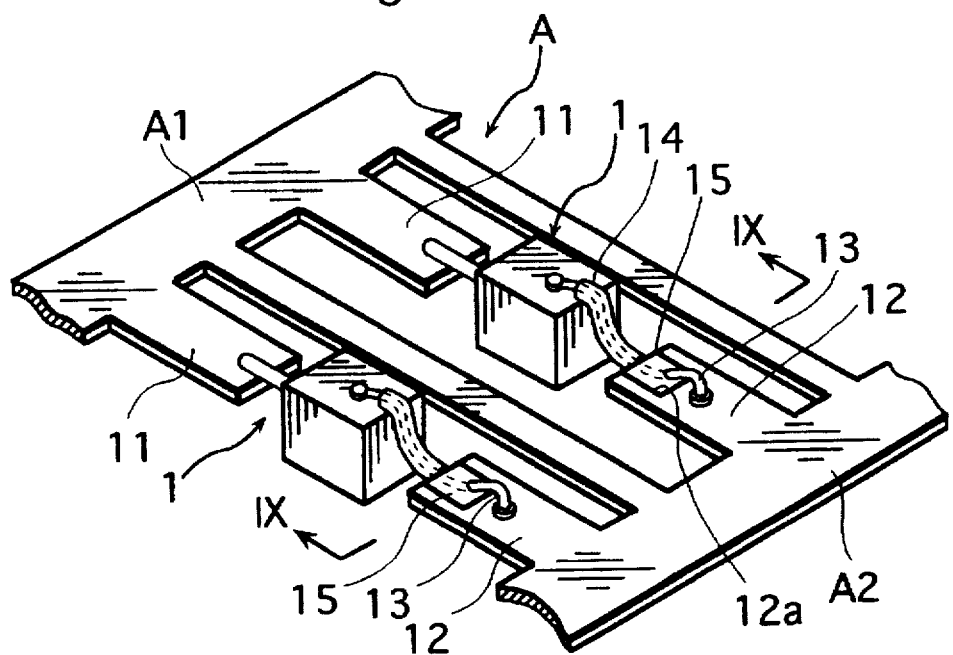
FIG. 8 is a perspective view showing a step of forming a resin fixer for each fuse wire in the process of the first embodiment.
Figure 9:
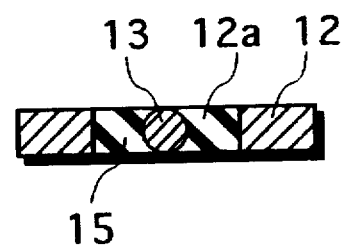
FIG. 9 is a sectional view taken on lines IX—IX in FIG. 8.

Then, as shown in FIGS. 8 and 9, a resin fixer 15 is formed to fit in the tip cutout 12a of each cathode lead 12 to fix and protect the corresponding fuse wire 13. In this way, a portion of the fuse wire 13 located in the tip cutout 12a is prevented from unexpectedly moving. The resin fixer 15 may be made of any suitable resin material such as a thermoplastic resin (e.g. polypropylene) and thermosetting resin (e.g. epoxy resin).

Figure 10:
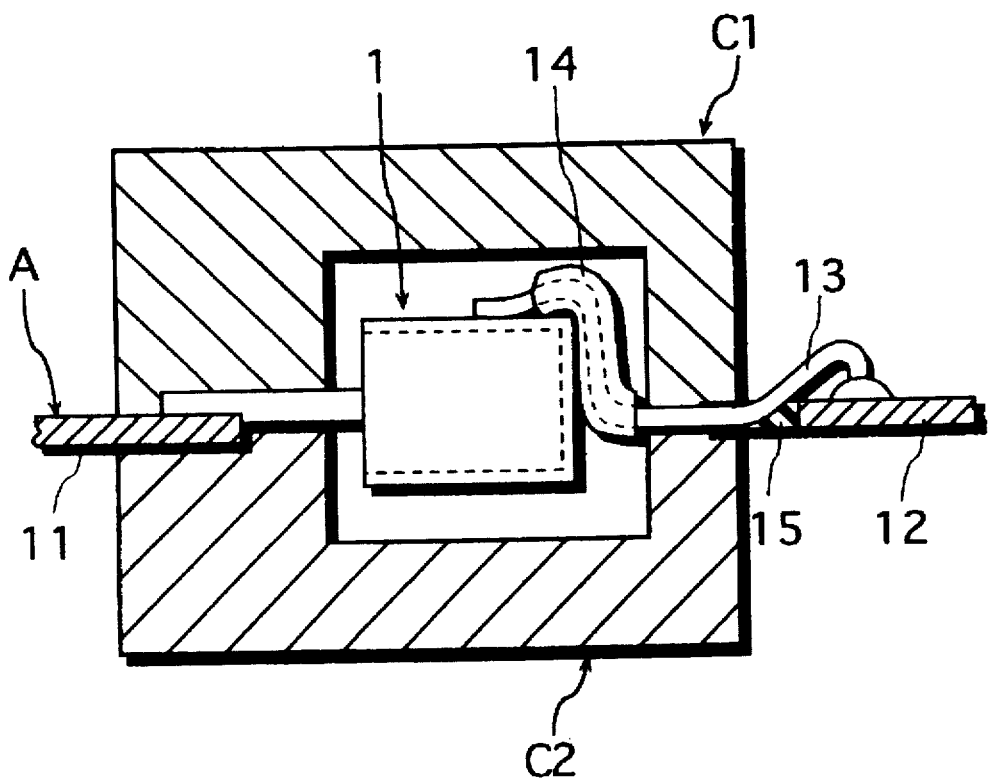
FIGS. 10 and 11 are sectional views showing a step of forming a resin package for each capacitor element in the process of the first embodiment.
Figure 11:
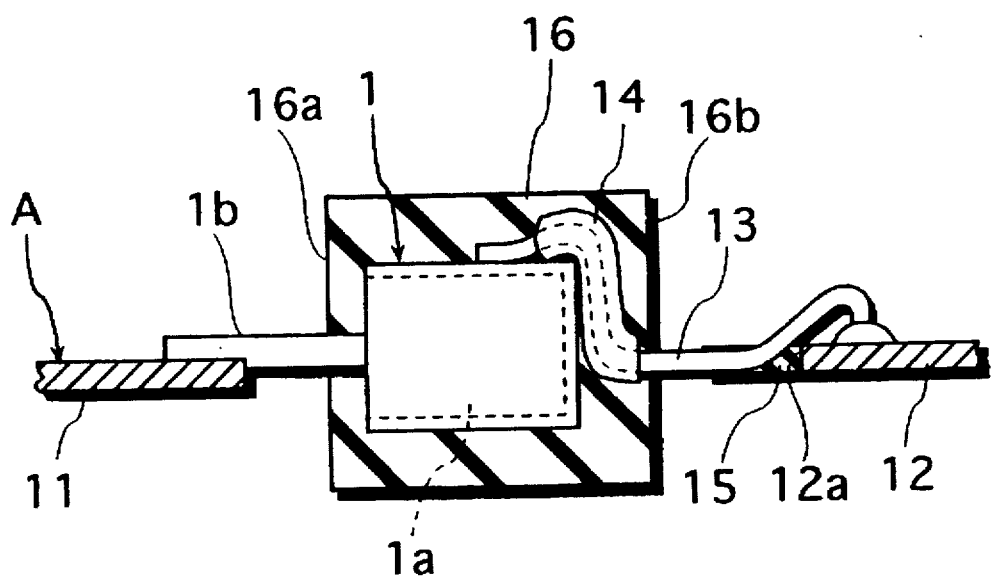

Then, as shown FIG. 10, each capacitor element 1 and the corresponding fuse wire 13 together with the leadframe A is placed between an upper mold member C1 and a lower mold member C2, and both mold members C1, C2 are clamped together. In this condition, a fluid resin is injected into the molding cavity defined between the respective mold members C1, C2. As a result, a resin package 16 is formed which encloses the capacitor element 1 and the fuse wire 13, as shown in FIG. 11. The resin package 16, which may be made of epoxy resin, has a first end face 16a from which the anode wire 1b projects out, and a second end face 16b opposite to the first end face 16a.

Figure 12:
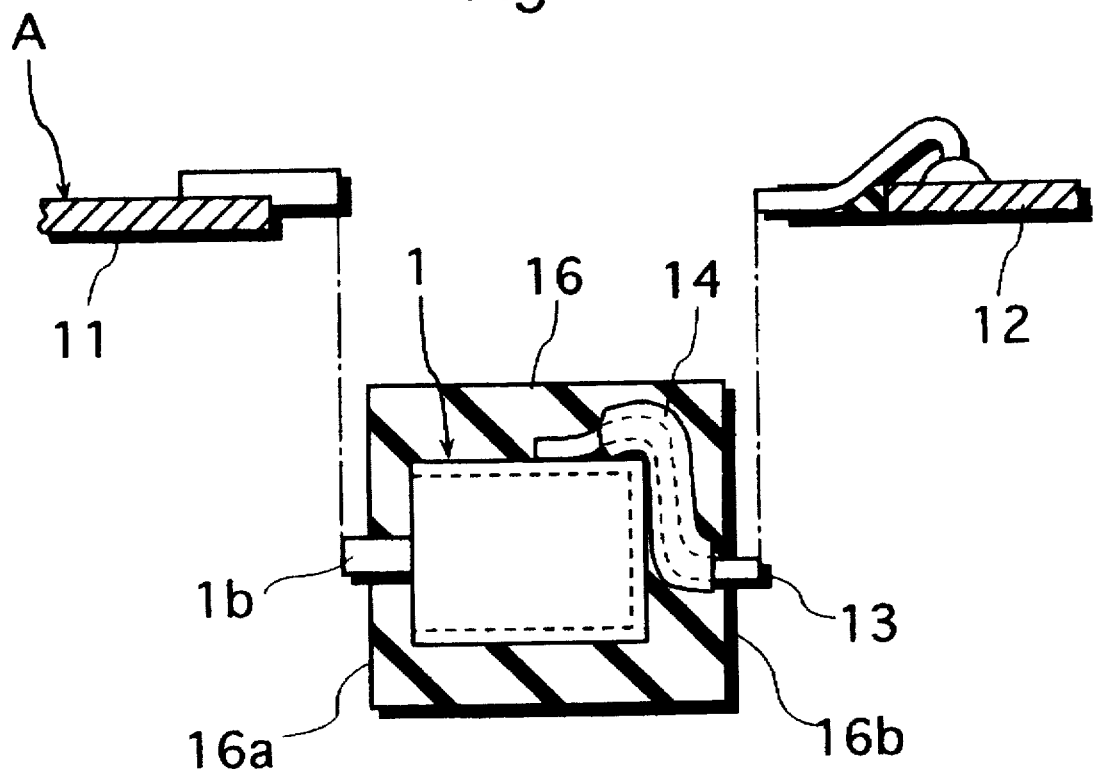
FIG. 12 is a sectional view showing a step of separating each packaged capacitor element from the leadframe in the process of the first embodiment.

Then, as shown in FIG. 12, the anode wire 1b of each capacitor element 1 is cut between the resin package 16 and the corresponding anode lead 11, whereas the fuse wire 13 is similarly cut between the resin package 16 and the corresponding cathode lead 12. As a result, the packaged capacitor element 1 is separated from the leadframe A.

Figure 13:
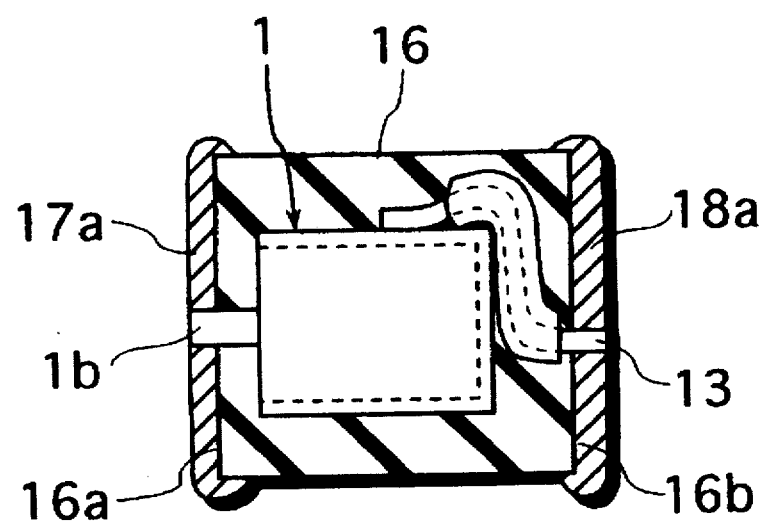
FIGS. 13 and 14 are sectional views showing a step of forming an anode terminal electrode and a cathode terminal electrode for each packaged capacitor element in the process of the first embodiment.

Then, as shown in FIG. 13, a metal paste such as silver paste is applied to the first end face 16a of the resin package 16 and thereafter dried for hardening to form an inner anode electrode layer 17a in electrical conduction with the anode wire 1b. Similarly, a metal paste is also applied to the second end face 16b of the resin package 16 and thereafter dried for hardening to form an inner cathode electrode layer 17a in electrical conduction with the fuse wire 13.

Figure 14:
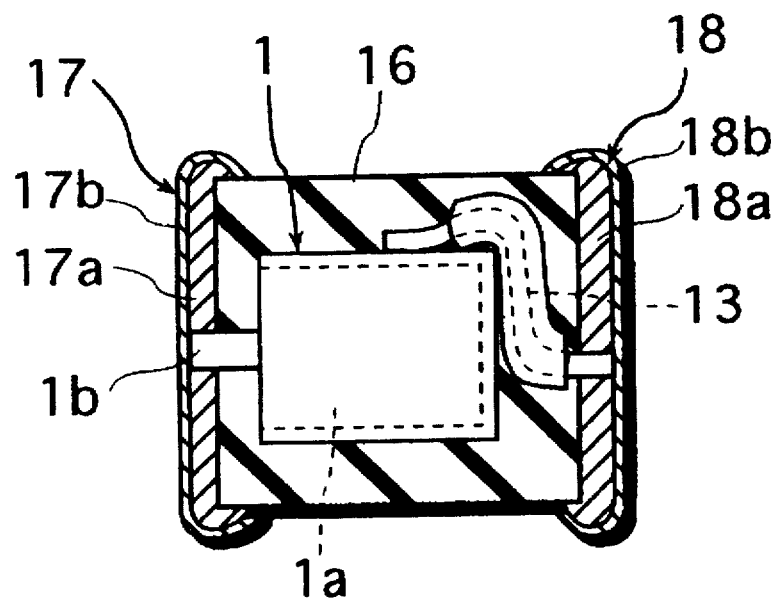

Finally, as shown in FIG. 14, an outer anode electrode layer 17b is formed on the inner anode electrode layer 17a by plating with a suitable metal such as solder or tin to provide an anode terminal electrode 17 in combination with the inner anode electrode layer 17a. Similarly, an outer cathode electrode layer 18b is formed on the inner cathode electrode layer 18a by plating to provide a cathode terminal electrode in combination with the inner cathode electrode layer 18a. As a result, a fused and packaged solid electrolytic capacitor is obtained.

According to the manufacturing process described above, since an intermediate portion of the fuse wire 13 is located in the tip cutout 12a of the corresponding cathode lead 12 at the time of molding the resin package 16 (see FIGS. 10 and 11), all or most of the clamping force applied to the upper and lower mold members C1, C2 is born by the cathode lead 12. Thus, the fuse wire 13 is prevented from being compressively deformed or cut by the clamping force. It should be appreciated that such an advantage is obtainable even if the resin fixer 15 does not fill the cathode lead tip cutout 12a.

Further, since the resin fixer 15 firmly retains an intermediate portion of the fuse wire 13 in the tip cutout 12a of the cathode lead 12, the fuse wire 13 is also prevented from positionally deviating due to the injected fluid resin at the time of molding the resin package 16.

As a modification of the first embodiment, the elastic resin member 14 may be formed after bending the fuse wire 13 to bring an intermediate portion thereof into the tip cutout 12a of the corresponding cathode lead 12 (see FIGS. 6 and 7). Further, a resin material for forming the elastic resin member 14 may be made to fill the tip cutout 12a of the cathode lead 12, thereby obviating the need for separately the resin fixer 15 (see FIGS. 8 and 9).

Figure 15:
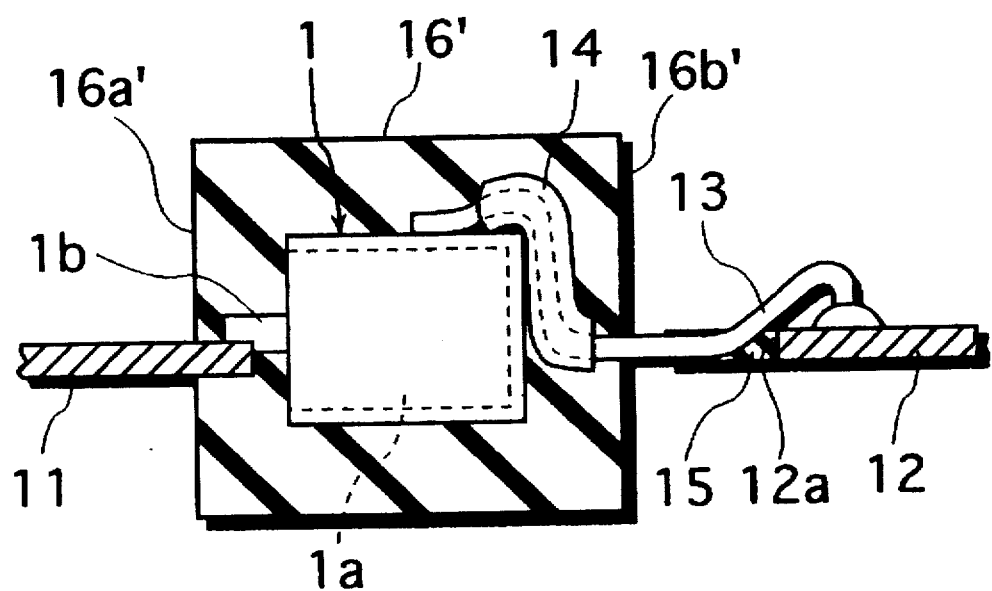
FIG. 15 is a sectional view showing a modified step of forming a resin package for each capacitor element in a process of making package-type fused solid electrolytic capacitors according to a second embodiment of the present invention.
Figure 16:
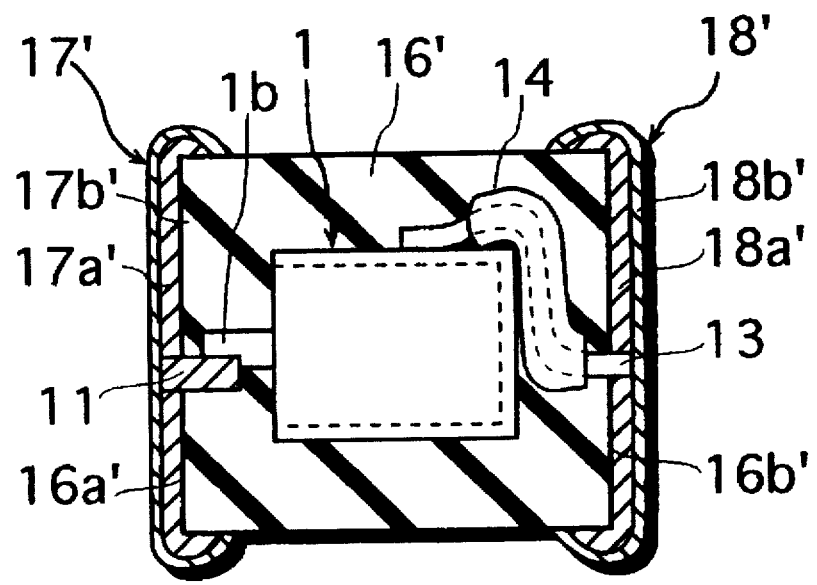
FIG. 16 is a sectional view showing a product obtained by the process of the second embodiment.

FIGS. 15 and 16 illustrate a process for making package-type fused solid electrolytic capacitors according to the second embodiment of the present invention. The process of this embodiment is substantially the same as that of the first embodiment up to the formation of the resin fixer 15 (FIGS. 1 through 9).

According to the second embodiment, a resin package 16' is formed in such a manner as to enclose a tip portion of the corresponding anode lead 11, as shown in FIG. 15. After cutting the anode lead 11 and the fuse wire 13, an anode terminal electrode 17' consisting of an inner anode electrode layer 17a' and a plated outer anode electrode layer 17b' is formed on the first end face 16a' of the resin package 16' in electrical conduction with the remaining portion of the anode lead 11, whereas a cathode terminal electrode 18' consisting of an inner cathode electrode layer 18a' and a plated outer cathode electrode layer 18b' is formed on the second end face 16b' of the resin package 16' in electrical conduction with the fuse wire 13, as shown in FIG. 16.

Figure 17:
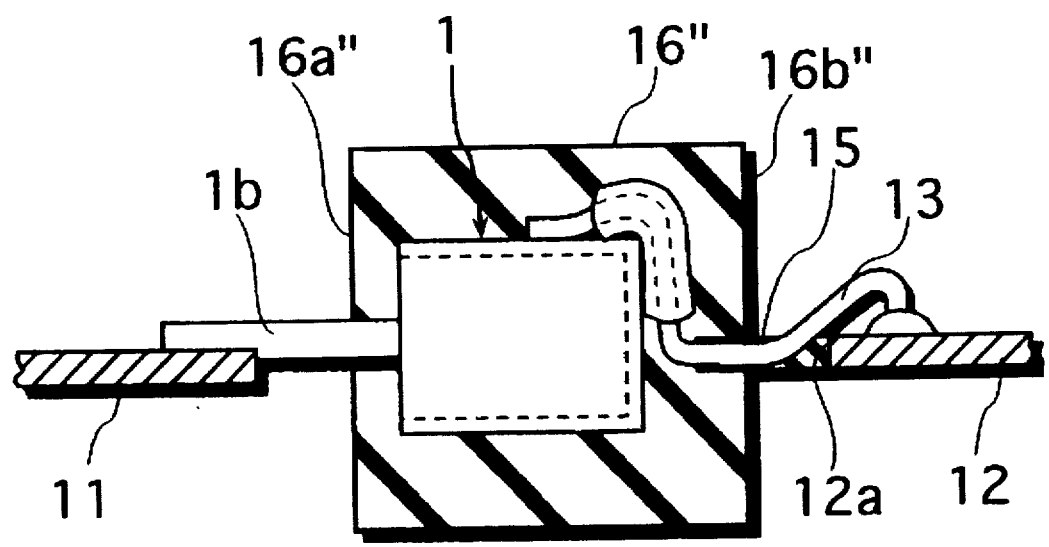
FIG. 17 is a sectional view showing another modified step of forming a resin package for each capacitor element in a process of making package-type fused solid electrolytic capacitors according to a third embodiment of the present invention.
Figure 18:
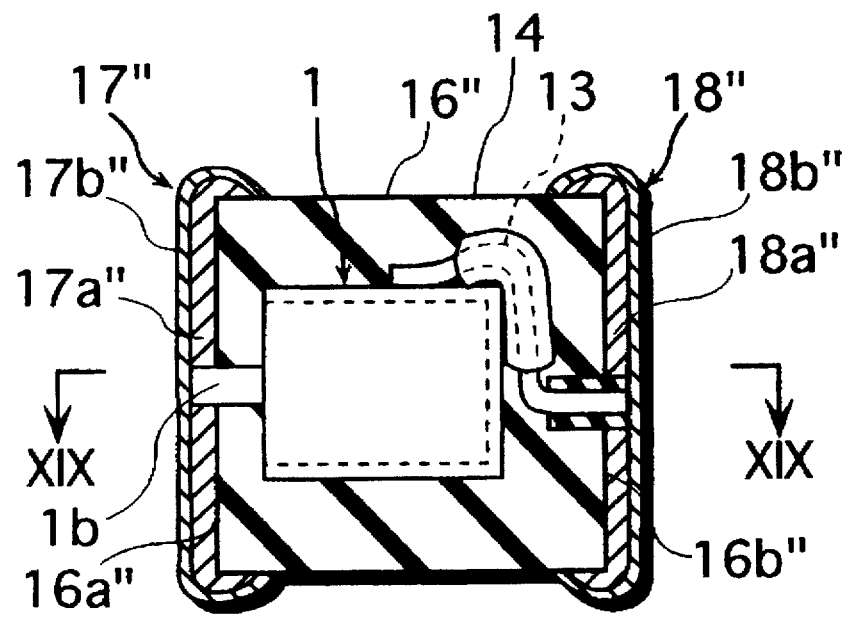
FIG. 18 is a sectional view showing a product obtained by the process of the third embodiment.
Figure 19:
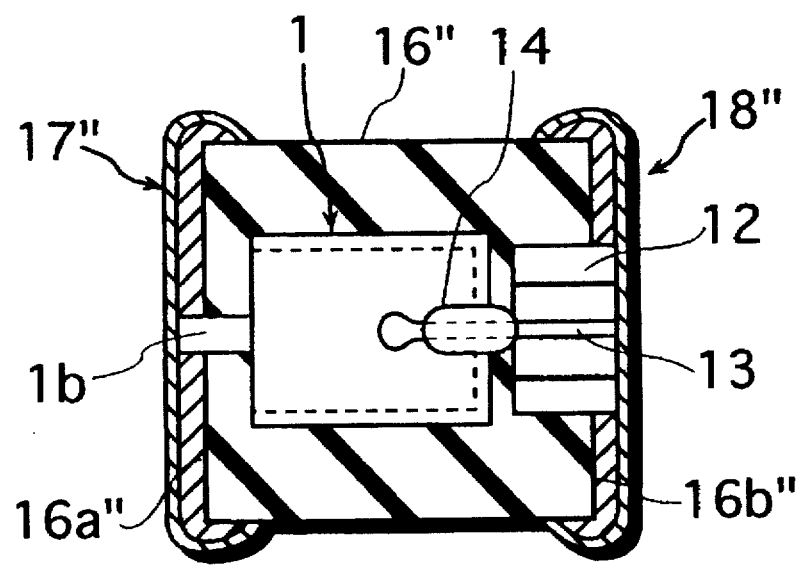
FIG. 19 is a sectional view taken along lines XIX—XIX in FIG. 18.

FIGS. 17 through 19 illustrate a process for making package-type fused solid electrolytic capacitors according to the third embodiment of the present invention. Again, the process of this embodiment is substantially the same as that of the first embodiment up to the formation of the resin fixer 15 (FIGS. 1 through 9).

According to the third embodiment, a resin package 16" is formed in such a manner as to enclose a tip portion of the corresponding cathode lead 12 together with a portion of the resin fixer 15, as shown in FIG. 17. After cutting the anode wire 1b and the cathode lead 12 together with the fuse wire 13, an anode terminal electrode 17" consisting of an inner anode electrode layer 17a" and a plated outer anode electrode layer 17b" is formed on the first end face 16a" of the resin package 16" in electrical conduction with the anode lead 1b, whereas a cathode terminal electrode 18" consisting of an inner cathode electrode layer 18a" and a plated outer cathode electrode layer 18b" is formed on the second end face 16b" of the resin package 16" in electrical conduction with the fuse wire 13, as shown in FIGS. 18 and 19.

Of course, the second embodiment (FIGS. 15 and 16) and the third embodiment (FIGS. 17 through 19) may be combined. Such a combination will provide a product wherein a resin package encloses respective tip portions of anode and cathode leads together with a resin fixer.

Figure 20:
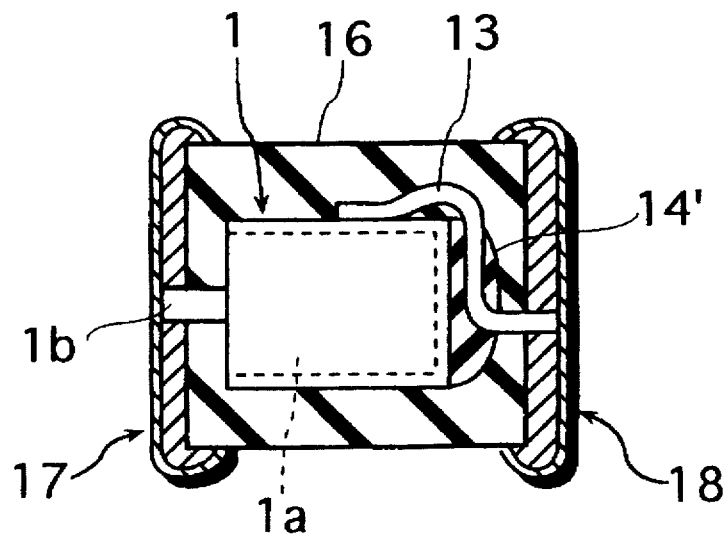
FIG. 20 is a sectional view showing a package-type fused solid electrolytic capacitor made by a modified process of the present invention.
Figure 21:
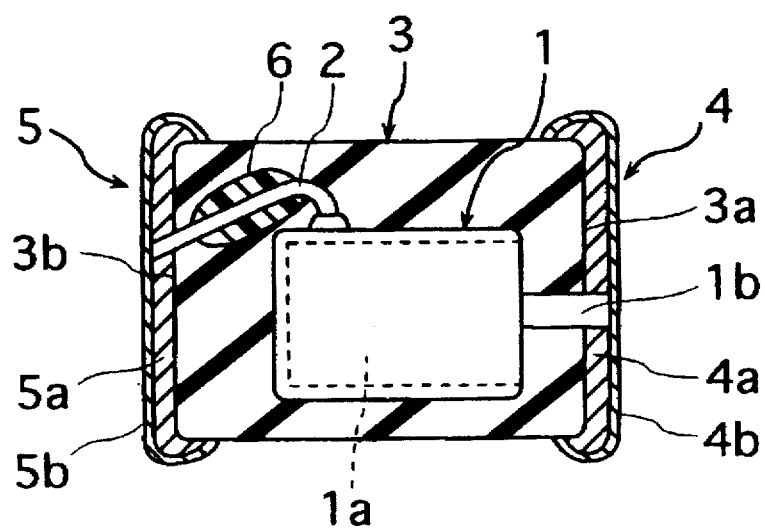
FIG. 21 is a sectional view showing a prior art package-type fused solid electrolytic capacitor.

Further, as shown in FIG. 20, a fluid resin material for forming an elastic resin member 14' may be first deposited on an end face of the chip body 1a, and the fuse wire 13 may be subsequently bent so as to be partially embedded in the fluid resin material before curing.

The preferred embodiments of the present invention being thus described, it is obvious that the same may be varied in many ways. For instance, while all of the embodiments utilize a leadframe which comprise a plurality of anode leads paired with a plurality of cathode leads, only a single pair of anode and cathode leads is sufficient for carrying out the present invention. Such variations are not to be regarded as a departure from the spirit and scope of the present invention, and all such modifications as would be obvious to those skilled in the art are intended to be included within the scope of the following claims.

I claim:

1. A process for making a package-type fused solid electrolytic capacitor which comprises: a capacitor element having a chip body and an anode wire projecting from the chip body; a safety fuse wire having one end connected to the chip body; a resin package enclosing the capacitor element together with the fuse wire; an anode terminal electrode formed on the resin package in electrical conduction with the anode wire; and a cathode terminal electrode formed on the resin package in electrical conduction with the fuse wire; wherein the process comprises the steps of:

mounting the capacitor element between an opposed pair of anode and cathode leads with the anode wire attached to the anode lead, the cathode lead having a tip cutout;

connecting a material fuse wire to the chip body of the capacitor element and to the cathode lead with an intermediate portion of the material fuse wire located in the tip cutout of the cathode lead;

molding the resin package to enclose the capacitor element together with the material fuse wire;

separating the resin package from the anode and cathode leads by cutting;

forming the anode terminal electrode on the resin package in electrical conduction with the anode wire; and forming the cathode terminal electrode on the resin package in electrical conduction with the fuse wire.

2. The process according to claim 1, further comprising an additional step of forming a resin fixer fitted in the tip cutout of the cathode lead for retaining said intermediate portion of the material fuse wire before molding the resin package.

3. The process according to claim 1, further comprising an additional step of forming an elastic resin member for partially enclosing the material fuse wire before molding the resin package.

4. The process according to claim 3, wherein, after forming the elastic resin member but before molding the resin package, the material fuse wire is bent for bringing said intermediate portion in the tip cutout of the cathode lead.

5. The process according to claim 3, wherein, before molding the resin package, the elastic resin member is formed on the chip body of the capacitor element by depositing a fluid resin material, the material fuse wire is caused to be partially embedded in the deposited fluid resin material before curing thereof.

6. The process according to claim 1, wherein the resin package is molded so as to enclose a tip portion of the anode lead, the tip portion of the anode lead remaining in the resin package even after the resin package is separated from the anode and cathode leads.

7. The process according to claim 1, wherein the resin package is molded so as to enclose a tip portion of the cathode lead, the tip portion of the cathode lead remaining in the resin package even after the resin package is separated from the anode and cathode leads.

8. The process according to claim 1, wherein the anode and cathode leads are integral parts of a leadframe which is also formed with additional pairs of anode and cathode leads.

* * * * *